United States Patent [19]

Natori et al.

[11] Patent Number: 4,883,621

[45] Date of Patent: Nov. 28, 1989

[54] METHOD FOR FORMING CAST ARTICLE BY SLIP CASTING

[75] Inventors: Tatsuo Natori, Kashiwa; Takashi Shimaguchi, Ibaraki; Akihide Watanabe, Ibaraki; Toshihiro Yamada, Ibaraki, all of Japan

[73] Assignee: Hitachi, Ltd., Tokyo, Japan

[21] Appl. No.: 883,759

[22] Filed: Jul. 9, 1986

[30] Foreign Application Priority Data

Jul. 12, 1985 [JP] Japan ................................ 60-152235
Nov. 1, 1985 [JP] Japan ................................ 60-243953

[51] Int. Cl.[4] ................................ C04B 33/28
[52] U.S. Cl. ................................ 264/86; 264/219; 264/317; 419/40; 419/66
[58] Field of Search ................................ 264/86, 317, 219; 419/40, 66

[56] References Cited

U.S. PATENT DOCUMENTS 1,612,916 1/1927 Gorton ................................ 264/86
1,653,344 12/1927 Clawson .
1,816,744 7/1931 Quinn .
2,303,303 11/1942 Schleicher ................................ 264/86
3,311,516 3/1967 Jaunarajs et al. .
4,126,651 11/1978 Valentine ................................ 264/86
4,292,262 9/1981 Tobin ................................ 264/86
4,604,141 8/1986 Natori et al. ................................ 249/62

FOREIGN PATENT DOCUMENTS 3414096 10/1984 Fed. Rep. of Germany .
8102010 7/1981 PCT Int'l Appl. .
503537 4/1939 United Kingdom .
530778 12/1940 United Kingdom .
1482436 8/1977 United Kingdom .

*Primary Examiner*—James Derrington
*Attorney, Agent, or Firm*—Antonelli, Terry & Wands

[57] ABSTRACT

In a method for forming a cast article by slip casting through casting of a slip of powders of ceramics, etc. as disporsed in a solvent such as water, etc. into a solvent-absorbable, porous casting mold of gypsum, etc., the casting mold as made is heated to considerably lower the strength of the casting mold in a shape-maintainable range, the slip is cast into the cavity of the casting mold and after solidification of the slip into a green body the casting mold is removed to obtain a defect-free green body. The casting mold can be removed with much ease.

23 Claims, 5 Drawing Sheets

METHOD FOR FORMING CAST ARTICLE BY SLIP CASTING

BACKGROUND OF THE INVENTION

1. Field of the Invention

This invention relates to a method for forming a cast article by slip casting, which comprises casting a slip (slurry) of particles such as ceramic particles, metallic particles, etc., and particularly to a method suitable for forming a cast article of complicated shape.

2. Description of the Prior Art

As one of the prior art techniques relating to the present invention, mention can be made of British Patent No. 1,482,436. "Method for Making an Article by Slip Casting".

According to this prior art, a casting mold for a portion having a complex shape is produced using an organic material which is soluble in a solvent, while a gypsum mold is used for a portion having a simple shape. These two molds are then assembled to obtain a desired casting mold.

However, this method does not take into consideration the possibility that a density difference will occur on a green body between the organic portion and the gypsum portion depending upon the shape and size of the resulting cast article and will somehow affect the strength reliability, dimensional accuracy and workability.

There has been proposed a method comprising mixing 0.1 to 4% by weight of an organic polymer with calcined gypsum to make a casting mold, casting a ceramic slip into the casting mold, heating the casting mold together with a green body to 650°-700° C., thereby decomposing the organic polymer in the casting mold and lowering the strength of the casting mold, and then withdrawing the green body therefrom. However, the green body sometimes cracks in the case of forming cast articles of complicated shape owing to expansion and shrinkage by heating and cooling of the casting mold and the green body due to the heating together with the casting mold, a high strength of the casting mold, etc., as in the foregoing prior art

SUMMARY OF THE INVENTION

An object of the present invention is to provide a method suitable for forming a cast article of complicated shape by casting a slip into a casting mold whose strength is lowered in advance by heating, thereby preventing the cast article from cracking.

In a method for forming a cast article by slip casting through casting of a slip of powders of ceramics, etc. as dispersed in a solvent such as water, etc. into a solvent-absorbable, porous casting mold of gypsum, etc., a first aspect of the present invention is characterized in that the casting mold as made is heated to considerably lower the strength of the casting mold in a shape-maintainable range, the slip is cast into the cavity of the casting mold, and after solidification of the slip into a green body the casting mold is removed to obtain a defect-free green body. The casting mold can be removed with much ease.

The powders for the slip are not limited to ceramics, and any powders such as metal powders, carbon powders, etc. can be used, so long as they are insoluble in a solvent. The solvent is also not limited to water, and can include organic solvents such as ethyl alcohol, acetone, etc.

The casting mold must satisfy the following three requirements:

(1) The casting mold must be so porous as to absorb a liquid such as water, alcohol, etc. as a solvent for the slip, though it is not a disadvantage that a part of the casting mold fails to absorb the solvent.

(2) Mold material must have such a strength above a given level as to ensure the mold-making work, for example, a compression strength of at least 3-4 kg f/cm$^2$.

(3) The strength of the casting mold must be considerably lowered within a shape-maintainable range by heating. More specifically, a compression strength of about 1 kg f/cm$^2$ can be maintained.

Any casting mold can be used in the present invention, so long as it can satisfy the foregoing three requirements, and the casting mold is never limited only to one species, but in the formation of a cast article, a gypsum casting mold has been heretofore mainly used owing to its chracteristics.

The principle of the present invention will be described in detail below, referring to a gypsum casting mold as a typical example.

Gypsum ($CaSO_4.2H_2O$) includes two types, i.e. natural gypsum and chemically synthesized gypsum, and the following properties are possessed by both types:

(a) When gypsum is heated at 120° C. for a long time, water-soluble calcined gypsum is obtained, and is solidified as gypsum ($CaSO_4.2H_2O$) when made into a slurry with water:

$$CaSO_4.2H_2O \xrightarrow{\text{(120° C. calcined gypsum)}} CaSO_4.\tfrac{1}{2}H_2O \tag{1}$$

$$\underset{\text{(calcined gypsum)}}{2CaSO_4.\tfrac{1}{2}H_2O} + 3H_3O \longrightarrow 2CaSO_4.2H_2O \tag{2}$$

(b) When gypsum is heated above 200° C. for a long time, it is dehydrated into anhydrous gypsum of monoclinic system.

$$\underset{\text{gypsum}}{CaSO_4.2H_2O} \xrightarrow{\text{heating at 120–130° C.}} \underset{\text{semi-hydrated gypsum}}{CaSO_4.\tfrac{1}{2}H_2O} \tag{3}$$

$$CaSO_4.\tfrac{1}{2}H_2O \xrightarrow{\text{heating above 200° C.}} \underset{\text{anhydrous gypsum}}{CaSO_4} \tag{4}$$

The novel and inventive point of the present invention resides in a finding that when gypsum made into a casting mold is heated to 120° C. to 130° C., it turns into semihydrated gypsum with lowered strength, and the strength is further lowered to about 10% of or lower than the initial strength (strength after drying at 50° C.) when the semihydrated gypsum is heated above 200° C., and in a recognition that when a slip is cast into the casting mold with the lowered strength, the casting mold can be removed with much ease after the solidification of the slip.

When the initial strength of a casting mold is higher in that case, the strength of the casting mold after heating will be also higher. For example, when the initial strength of a casting mold is 50 kg f/cm$^2$, the anhydrous gypsum obtained after the heating will have a residual strength of about 5 kg f/cm$^2$. That is, it is not easy to remove the casting mold from a green body.

Thus, according to a second mode of the present invention, inorganic powders are added to gypsum to lower the initial strength of a casting mold and prevent the casting mold from cracking that may develop during the heating. The inorganic powders include those of silica ($SiO_2$), mullite ($3Al_2O_3.2SiO_2$), zircon ($ZrO_2.SiO_2$), alumina ($Al_2O_3$), magnesia (MgO), clay ($Al_2O_3.2SiO_2.2H_2O$), etc., and preferably the fine powders of 200-mesh or under. The amount of the powders to be added is determined in view of the initial strength of gypsum alone, and the shape, size, etc. of a casting mold.

According to a third mode of the present invention, an organic material is added to gypsum to lower the initial strength of a casting mold, give an elasticity to the casting mold, thereby improving a shapability, and prevent the casting mold from cracking that may develop during the heating. The organic material includes water-insoluble ones such as cellulose powders as plant cellulose, and water-soluble ones such as methylcellulose (MC), hydroxypropylmethylcellulose (HPMC), carboxymethylcellulose (CMC), ethylcellulose (EC), and hydroxypropylcellulose (HPC), at least one of which can be used. The amount of the organic material to be added is determined in view of the initial strength of gypsum alone, and other conditions in the same manner as in the case of inorganic powders.

According to a fourth mode of the present invention, a combination of the inorganic powders and the organic material is added to the gypsum to further improve the effects according to the third mode of the present invention.

In the present invention, a process from making a casting mold to sintering a cast article is carried out in the following steps:

(1) making a casting mold→(2) heating the casting mold to lower the strength of the casting mold→(3) casting a slip→(4) disintegrating and removing the casting mold→(5) sintering a cast article Heating temperature for turning gypsum into anhydrous gypsum and lowering the strength of a casting mold is theoretically about 200° C., as is obvious from the said reaction equation, but fluctuates higher or lower, depending upon the heating time, the shape and size of a casting mold, and the condition of surrounding atmosphere. Up to 600° C., the strength of a casting mold is gradually lowered with increasing heating temperature, whereas above 600° C., sintering takes place with heating, and thus the strength of a casting mold is increased.

By heating, the compression strength of a gypsum casting mold is made about 1 kg f/cm$^2$, while making the binding force substantially lost. However, in that case the shape of the casting mold is maintained, and the casting mold is not damaged at all during the casting of a ceramic slip.

Owing to the very low strength of the casting mold, a green body is not susceptible at all to a stress from the casting mold during the step that the solvent of the ceramic slip is absorbed into the casting mold to form the green body, and during the step that the water content of the green body is decreased with time to dry the green body. Thus, neither cracks develop on the green body nor internal stresses are accumulated in the green body in these steps.

After the formation of a green body, a gypsum casting mold can be readily disintegrated and removed with an external force of about 1 kg f/cm$^2$ or less. That is, the disintegration and removal of the casting mold can be carried out at the same time with such an external force as a weakly compressed air or vacuum suction. Use of a brush, etc. is effective, if required. Anyway, a green body is neither damaged nor subjected to accumulation of internal stresses during the removal of a casting mold, and a perfect, crack-free cast article can be obtained by sintering the thus obtained green body.

In the foregoing, a gypsum casting mold has been described, but the present invention is not limited to a gypsum system.

Any casting mold system can be used, so far as the strength of the casting mold is considerably lowered by heating, and the casting mold after the heating can absorb the solvent from a slip. For example, a casting mold made from an inorganic material such as silica ($SiO_2$) and alumina ($Al_2O_3$) as an aggregate and an aqueous solution of polyvinyl alcohol (PVA), methylcellulose (MC), etc. as a binder can be used in the present invention with quite similar effects.

In that case, various inorganic powders as used in the case of the gypsum casting mold can be used besides the silica and the alumina, and also organic materials such as carbon powders, and metal powders can be used, so long as they can withstand heating at the given heating temperature.

The binder that can lose the binding force by heating is not limited to polyvinyl alcohol (PVA) and methylcellulose (MG), but at least one of water-soluble isobutane-maleic anhydride copolymer, polyacrylamide (PAAm), polyethylene oxide (PEO), polyvinylpyrolidone (PVP), water-soluble vinyl acetate polymer, acrylic copolymer, polyethyleneglycol (PEG), water-soluble wax, starch, glue, gum arabic, etc. can be used in an aqueous solution.

Heating conditions (temperature and time) for a casting mold depend upon whether the casting mold is of gypsum system or non-gypsum system, kind and mixing ratio of inorganic powders as an additive or aggregate, kind and mixing ratio of an organic material as a binder, a mixing ratio of water, conditions for a slip, shape and size of the casting mold, etc. and thus are determined in view of these respective factors.

According to the present invention, the strength of a casting mold as made is considerably lowered by heating, and a slip of ceramics, etc. is then cast into the casting mold, as described above. Thus, a cast article of complicated outside shape and cavity shape, which has been so far very difficult to make, that is, a cast article requiring a main mold and a core of considerable irregularity and complicated shape can be much easily made without any cracking thereon.

According to another aspect of the present invention, a cast article is made in the so called integrated casting mold composed of a low-strength mold on the cavity side of the casting mold and a high-strength mold to reinforce the low-strength mold. That is, the present inventors have found that an integrated casting mold comprising a first layer 15 on the cavity side of the mold and a second layer 16 of higher strength provided at the outside of the first layer 15, as shown in FIG. 8, is effective as a casting mold for slip casting. After such an integrated casting mold is prepared, a slip is cast into the cavity of the casting mold and solidified to form a green body 18, and then the green body is removed from the casting mold. The first layer 15 near the green body is disintegrated owing to the low strength without any damage on the green body.

The second layer 16 of the casting mold is used to reinforce the first layer 15 and can be of gypsum system, ceramic system or heat-resisting resin system, and can be used repeatedly.

The first layer of the casting mold contains a combustible material in the gypsum, and the combustible material burns out by heating at 200° C. or higher. Thus, the binding force between the gypsum particles is weakened, and the strength is lowered. As the combustible material, plant cellulose is effective. After integration of the first layer with second layer to reinforce the first layer of a casting mold, and drying thereof, the strength of the first layer must be lowered within a shape-maintainable range by heating.

PREFERRED EMBODIMENTS OF THE INVENTION

EXAMPLE 1

Figure 1:
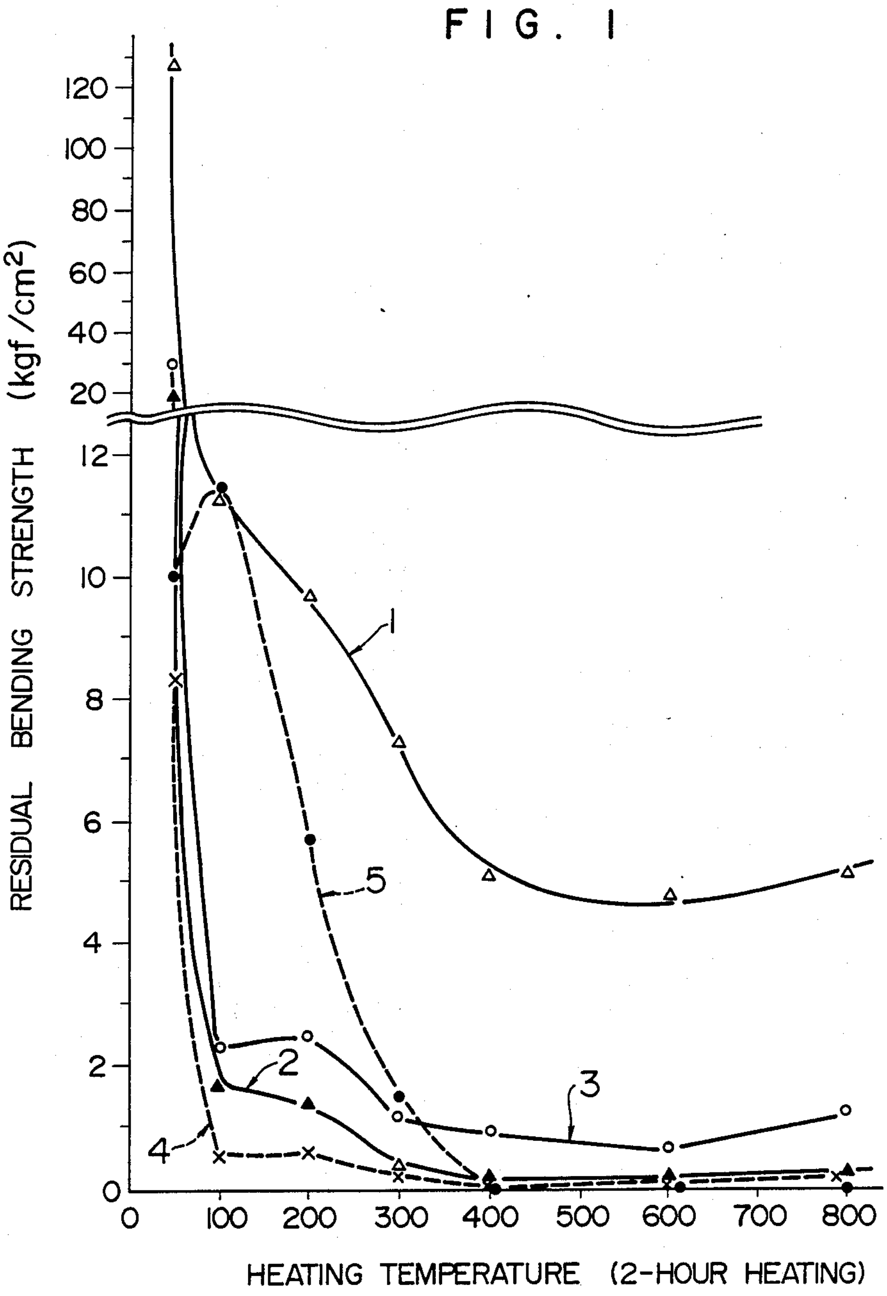
FIG. 1 is a diagram showing relationships between the heating temperature and the residual bending strength of casting molds for use in the present method for forming a cast article by slip casting.

Gypsum alone, gypsum and an organic material or an inorganic material or both, and an inorganic material as an aggregate and an organic material as a binder were mixed with water at 200 rpm for 5 minutes in ratios as shown in the following Table.

TABLE

| Components | | (Parts by weight) Sample No. 1 | 2 | 3 | 4 | 5 |
|---|---|---|---|---|---|---|
| Gypsum | | 100 | 100 | 100 | 100 | — |
| Organic material | Flaky cellulose (1) | — | — | 12 | 8 | — |
| | Polyvinyl alcohol | — | — | — | — | 7 |
| Inorganic material (2) | Silica ($SiO_2$) fine powders | — | 200 | — | 200 | — |
| | Alumina ($Al_2O_3$) fine powders | — | — | — | — | 100 |
| Water | | 40 | 120 | 90 | 220 | 28 |

(1)Particle size of flaky cellulose: 90% through 300-mesh and under
(2)Particle size of inorganic fine powder: 200-mesh and under Casting mold slurries of Samples Nos. 1 to 4 and a casting mold mixture of Sample No. 5 thus obtained were filled in resin molds for preparing a test piece (10×10×50 mm) and left standing a room temperature for one hour, and then the test pieces were removed from the resin molds and left standing in the atmosphere for 24 hours. Then, the test pieces were dried at 60° C. for 24 hours, whereby the weights of the test pieces were found to be constant.

Then, the test pieces were heated at 100° C., 200° C., 300° C., 400° C., 600° C. and 800° C. each for 2 hours in a muffle furnace, taken out thereof, left cooling in the atmosphere, and then subjected to measurement of residual bending strength. The results are shown in FIG. 1, where curve 1 relates to Sample No. 1, curve 2 to Sample No. 2, curve 3 to Sample 3, curve 4 to Sample No. 4, and curve 5 to Sample No. 5. The amount of added water was determined in view of the slurry flowability in Samples Nos. 1 to 4, and the shapability of a casting mold in Sample No. 5.

As is apparent from FIG. 1, the residual bending strength of the casting molds containing the predetermined amounts of inorganic material and organic material are drastically lowered to 1 kg f/cm$^2$ or less by heating to the predetermined temperature or higher. Anyway, the casting molds whose residual bending strength has been lowered to 1 kg f/cm$^2$ or less can be readily disintegrated and removed by weakly compressed air or vacuum suction, whereas the casting molds containing no additives have a residual bending strength as high as about 5 kg f/cm$^2$ and are hard to remove.

EXAMPLE 2

Figure 2:
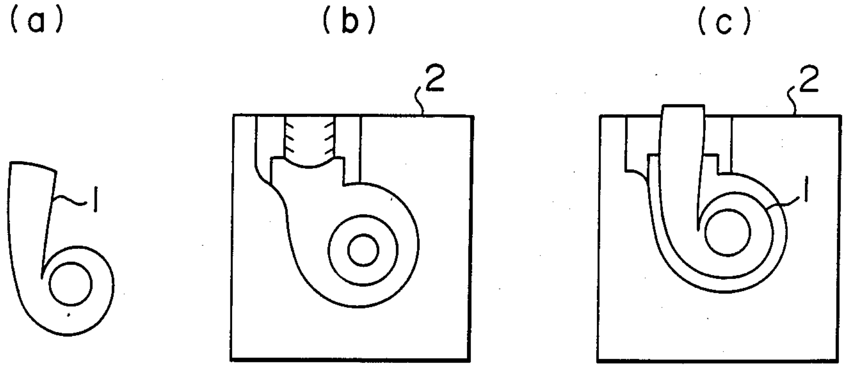
FIGS. 2 (*a*), (*b*) and (*c*) are outside views of casting mold for forming a turbocharger casing according to the present method.

100 parts by weight of gypsum was mixed with 200 parts by weight of silica ($SiO_2$) powders and 120 parts by weight of water in a mixer for 5 minutes to prepare a casting mold slurry. Then, the slurry was poured and filled in a wood pattern for a core for casting a casing for a turbocharger rotor to form a core. Then, the formed core was dried at 60° C. for 6 hours, and further heated at 250° C. for 3 hours to obtain a spiral type core 1 shown in FIG. 2(*a*) by heating at 250° C. for 3 hours. Then, the core 1 was provided in one-half piece of main mold 2 shown in FIG. 2(*b*) separately made, in the manner as shown in FIG. 2(*c*), to assemble a casting mold together with another half piece of main mold not shown in the drawing.

Figure 3:
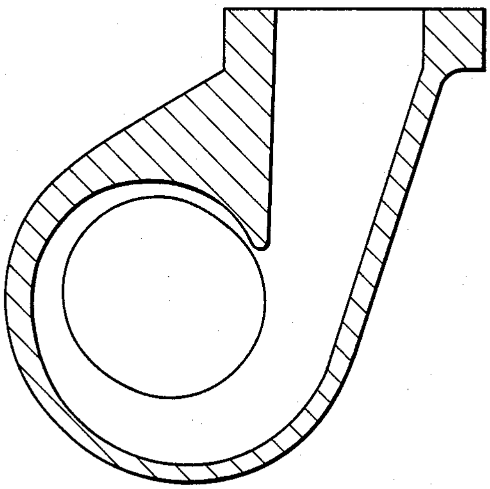
FIG. 3 is a cross-sectional view of turbocharger casing.
Figure 4:
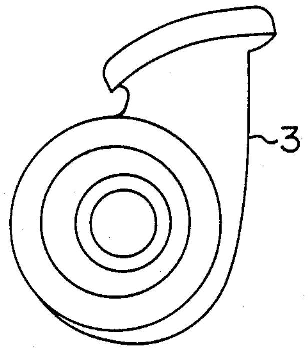
FIG. 4 is an outside view of turbocharger casing.

Then, 100 parts by weight of alumina powders having an average particle size of 2.5 μm was mixed with 20 parts by water and 0.2 parts by weight of a deflocculant for 24 hours in a ball mill to prepare an alumina slip. Then, the slip was poured and filled into the said assembled casting mold and left standing at room temperature for 4 hours. Then, only the main mold was removed therefrom. The spiral core could be disintegrated and removed with compressed air of 0.8 kg f/cm$^2$, whereby only a cast alumina article remained. Then, the cast article was placed in a furnace, heated gradually from room temperature upwards, and sintered at 1,600° C. for 4 hours, whereby a perfect alumina rotor casing having the cross-section shown in FIG. 3 and the appearance shown in FIG. 4 could be obtained.

EXAMPLE 3

Figure 5:
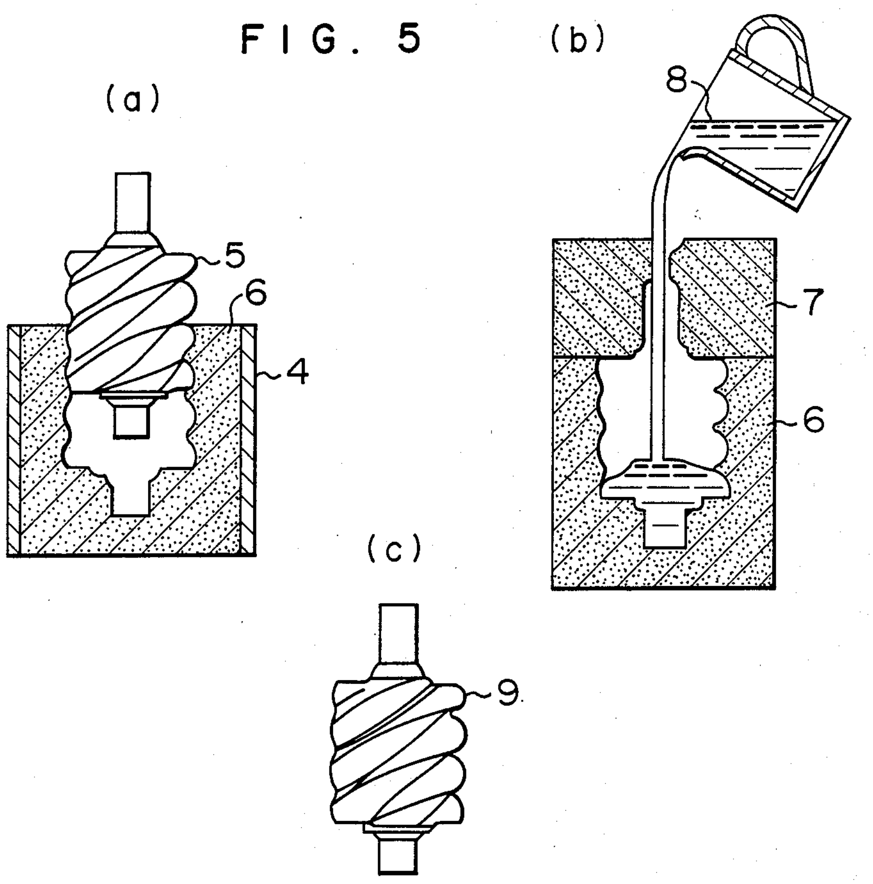
FIGS. 5 (*a*), (*b*) and (*c*) are explanatory views of applying the present invention to casting of a screw rotor.

100 parts by weight of gypsum was mixed with 12 parts by weight of flaky cellulose and 90 parts by weight of water for 5 minutes in a mixer to prepare a casting mold slurry. A rotor model 5 was provided at the center in a predetermined round metal frame 4 shown in FIG. 5(*a*), and the said casting mold slurry was filled into the space between the metal frame 4 and the rotor model 5, and then the entire body was placed in a vacuum chamber to remove foams from the filled slurry.

Then, the model 5 was withdrawn therefrom to form a main mold 6, which was then assembled with a separately formed upper mold 7 of the same composition as that of the main mold 6, as shown in FIG. 5(b). The assembled casting mold was dried at 80° C. for 2 hours and then heated at 400° C. for 3 hours to lower the strength of the casting mold.

Then, a separately prepared sialon slip 8 was cast into the casting mold and left standing for 8 hours to solidify the slip. The casting mold could be very readily removed by use of a brush and vacuum suction. Then, the remaining cast article was gradually heated and sintered at 1,800° C. in the same manner as in Example 2, whereby a sintered sialon screw rotor 9 shown in FIG. 5(c) could be obtained.

EXAMPLE 4

100 parts by weight of gypsum was mixed with 8 parts by weight of flaky cellulose, 200 parts by weight of fine alumina powders and 220 parts by weight of water for 5 minutes in a mixer to prepare a casting mold slurry.

Figure 6:
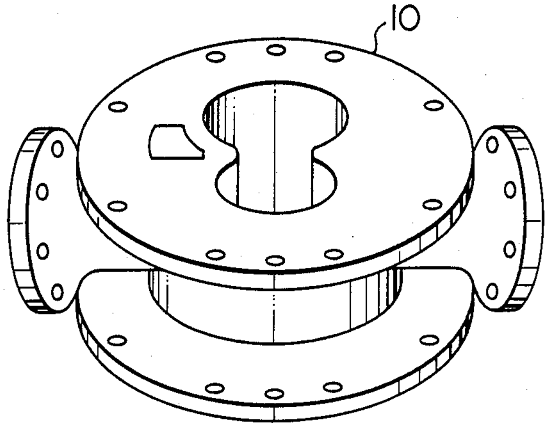
FIG. 6 is an outside view of foamed polystyrene model for use in making a screw rotor casing.
Figure 7:
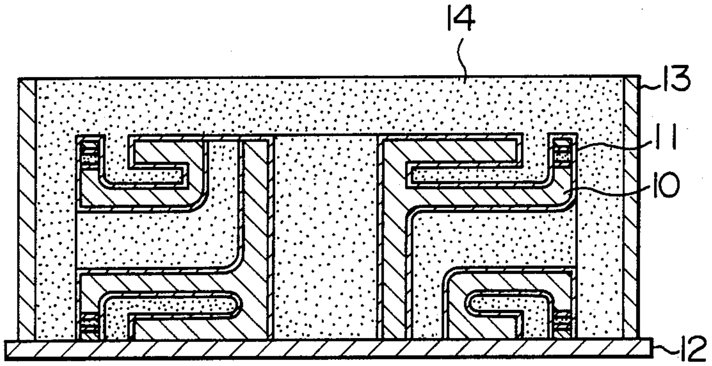
FIG. 7 is a cross-sectional view of foamed polystyrene model embedded in a casting mold.

A low viscosity solution of one-pot curable silicone rubber of deoximized type was sprayed onto the entire surfaces of a screw rotor casing model 10 made from foamed polystyrene (foaming ratio: 50- fold) except the upper end surface, shown in FIG. 6 to form a cured silicone rubber coating film 11 having a uniform thickness of about 100 μm on the model surfaces.

The model was reversed and fixed onto a surface plate 12 and a metal frame 13 was placed around the model 10. The said casting mold slurry 14 was poured and filled into all the spaces between the metal frame and the model 10 on the surface plate 12. After the casting mold slurry 14 was cured, the surface plate 12 was removed therefore, and acetone sprays were brought into direct contact with the model 10 from the overhead. The volume of the model 10 was suddenly reduced to 1/50, and the shrunk model 10 attached to the inside of the said insoluble coating film 11. The shrunk model 10 could be removed to the outside of the casting mold cavity together with the coating film.

Then, the casting mold was heated at 300° C. for 2 hours together with the metal frame 13 to remove free water therefrom and also to lower the strength of the casting mold.

Then, the casting mold was left standing in the atmosphere, and a separately prepared $Si_3N_4$ slip was cast into the casting mold and left standing for 8 hours to solidify the slip. Then, the casting mold could be readily removed by vacuum suction to obtain a $Si_3N_4$ green body. By heating the green body at 1,800° C. for a given time, a sintered $Si_3N_4$ casing could be obtained.

EXAMPLE 5

35 parts by weight of a solution containing water and polyvinyl alcohol (PVA) in a ratio of the former to the latter of 100:25 by weight was uniformly mixed with 100 parts by weight of fine alumina powders in a mixer to prepare a casting mold sand.

Then, a spiral core 1 was formed from the casting mold sand by stamping in a wood core pattern for forming a casing as shown in FIG. 2. Then, the core was heated at 350° C. for 4 hours to lower the strength of the core, and provided in one-half piece of separately prepared main gypsum mold 2 as shown in FIG. 2(b) in the same manner as shown in FIG. 2(c) and assembled with another half piece of the main mold not shown in the drawing to form a casting mold.

A separately prepared slip of partially stabilized zirconia (PSZ) fine powders was poured into the cavity of the casting mold and left standing at room temperature for 4 hours. Then, only the gypsum main molds were removed therefrom at first. Then, the core was disintegrated with a bamboo spatula. The core could be very readily removed. The thus obtained green body was placed in a furnace and heated gradually from room temperature upwards, and sintered at 1,850° C. for 2 hours, whereby a perfect zirconia rotor casing was obtained.

EXAMPLE 6

Figure 8:
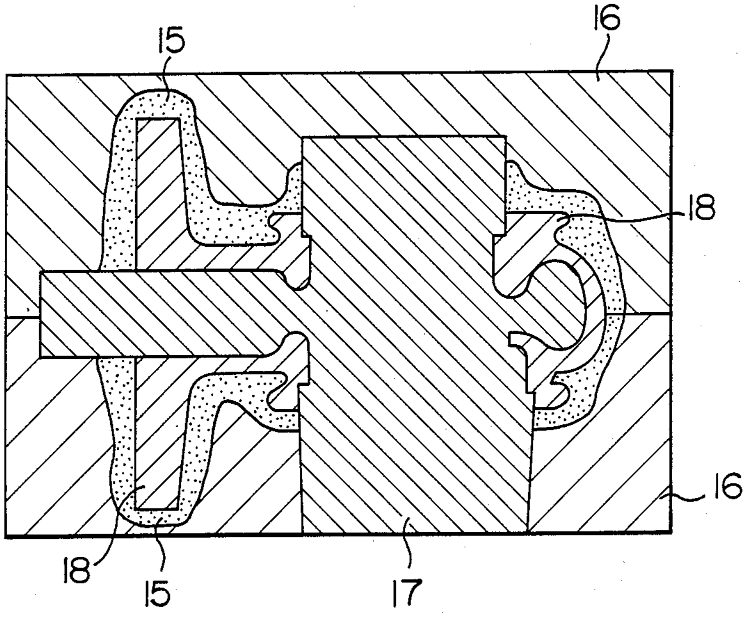
FIG. 8 is a cross-sectional view of integrated casting mold for use in a method according to another aspect of the present invention.

A first layer 15 of casting mold was made from a mixture of gypsum, water and plant cellulose powders and a second layer 16 of casting mold for reinforcing the first layer 15 was made from resin-containing gypsum, as shown in FIG. 8. The mixing ratio of the mixture for the first layer 15 was gypsum:water:cellulose powders=100:75:14 by weight. The first layer 15 and the second layer 16 were assembled together with a core 17 having the same composition as that of the first layer 15 to form an integrated casting mold.

The integrated casting mold was kept at 250° C. for 24 hours to burn out the cellulose and sufficiently lower the strength of the first layer 15. Then, a slip of silicon carbide in a ratio of silicon carbide to water of 100:40 by weight was poured and filled in the casting mold. 2 hours thereafter, the slip was found to be solidified, and then the second layer 16 and the core 17 were removed therefrom, whereby a green body 18 with a small amount of the first layer 15 as attached thereto was obtained. The first layer 15 as attached to the green body 15 could be readily removed therefrom with a soft paint brush, and a ceramic casing of the same shape as that of a casing shown in FIG. 4 could be obtained.

What is claimed is:

1. A method for forming a cast article by slip casting through casting of a slip into a casting mold composed mainly of gypsum and removing of the casting mold after solidification of the slip, which comprises heating the casting mold prior to casting the slip therein, said casting mold being heated at a temperature of 120°-130° C. such that the strength of the casting mold is lowered, but is kept within a shape-maintainable range, then casting the slip into the casting mold, forming a green body from the slop, and removing the casting mold, whereby cracks and internal stresses in the geen body due to the strength of the casting mold are avoided.

2. A method according to claim 1, wherein the gypsum is turned into anhydrous gypsum by the heating.

3. A method according to claim 1, wherein the casting mold contains inorganic particles.

4. A method according to claim 3, wherein the inorganic particles are particles of at least one member selected from silica ($SiO_2$), mullite ($3Al_2O_3.2SiO_2$), zircon ($ZrO_2.SiO_2$), alumina ($Al_2O_3$), magnesia ($MgO$), and clay ($Al_2O_3.2SiO_2.2H_2O$).

5. A method according to claim 2, wherein the casting mold contains an organic material whose strength is lost by the heating.

6. A method according to claim 5, wherein the organic material is a plant material.

7. A method according to claim 6, wherein the plant material is hygroscopic.

8. A method according to claim 6, wherein the plant material is water-insoluble.

9. A method according to claim 8, wherein the plant material is water-insoluble cellulose.

10. A method according to claim 6, wherein the plant material is water-soluble.

11. A method according to claim 10, wherein the water-soluble material is at least one member selected from methylcellulose (MC), hydroxypropylmethylcellulose (HPMC), carboxymethylcellulose (CMC), ethylcellulose (EC), and hydroxypropylcellulose (HPC).

12. A method according to claim 2, wherein the casting mold contains inorganic particles and an organic material.

13. A method according to claim 12, wherein the inorganic particles is at least one member selected from silica ($SiO_2$), mullite ($3Al_2O_3.SiO_2$), zirconia ($ZrO_2$.-$SiO_2$), alumina ($Al_2O_3$), magnesia (MgO), and clay ($Al_2O_3.2SiO_2.2H_2O$).

14. A method according to claim 12, wherein the organic materials is at least one member selected from cellulose powders, methylcellulose (MC), hydroxypropylmethylcellulose (HPMC), carboxymethylcellulose (CMC), ethylcellulose (EC), and hydroxypropylcellulose (HPC).

15. A method for forming a cast article by slip casting through casting of a slip into a casting mold composed mainly of gypsum and removing of the casting mold after solidification of the slip, which comprises making an integrated casting mold composed of a first layer on the cavity side of the casting mold and a second layer having a higher heat-resisting strength than that of the first layer and capable of repeated use on the back side of the first layer as the casting mold, heating the integrated casting mold prior to casting the slip into the integrated casting mold, the integrated casting mold being heated at a temperature of 120°-130° C. such that the strength of the first layer is lowered, but is kept within a shape-maintainable range, then casting the slip into the integrated casting mold, and removing the first layer therefrom, thereby obtaining a green body, whereby cracks and internal stresses in the green body due to the strength of the first layer are avoided.

16. A method according to claim 1, wherein after heating to 120°-130° C. the casting mold is heated at a temperature so as to lower the compression strength of the casting mold to about 1 Kg f/cm$^2$.

17. A method according to claim 1, wherein said heating the casting mold includes two heating sub-steps, a first heating sub-step at a temperature of 120° C.-130° C., and a second heating sub-step at a temperature of above 200° C.

18. A method according to claim 15, wherein after heating to 120° C.-130° C. the integrated casting mold is heated at a temperature so as to lower the compression strength of the first layer to about 1 Kg f/cm$^2$.

19. A method according to claim 15, wherein said heating the integrated casting mold includes two heating sub-steps, a first heating sub-step at a temperature of 120° C.-130° C., and a second heating sub-step at a temperature of above 200° C.

20. A method for forming a cast article by slip casting through casting of a slip into a casting mold, the casting mold being made of a material whose strength is reduced by heating, which comprises heating the casting mold prior to casting the slip therein, said casting mold being heated at a temperature of 120°-130° C. such that the strength of the casting mold is lowered, but is kept within a shape-maintainable range, then casting the slip into the casting mold, forming a green body from the slip, and removing the casting mold, whereby cracks and internal stresses in the green body due to the strength of the casting mold are avoided.

21. A method according to claim 20, wherein the material of the casting mold is an inorganic material, as an aggregate, and a binder.

22. A method according to claim 21, wherein the binder is selected from the group consisting of polyvinyl alcohol, methylcellulose, water-soluble isobutane-maleic anhydride copolymer, polyacrylamide, polyethylene oxide, polyvinylpyrolidone, vinyl acetate polymer, acrylic copolymer, polyethylene glycol, wax, starch, glue and gum arabic.

23. A method according to claim 22, wherein said inorganic material is selected from the group consisting of silica and alumina.

* * * * *